(12) United States Patent
Tipton et al.

(10) Patent No.: US 11,499,611 B2
(45) Date of Patent: Nov. 15, 2022

(54) COUPLED STEERING GEAR SHAFT

(71) Applicant: R.H. SHEPPARD CO., INC., Hanover, PA (US)

(72) Inventors: Jeffrey Tipton, Gettysburg, PA (US); John Vantran, Parkton, MD (US); Manjunath Terwad, York, PA (US); Jared Pitzer, Red Lion, PA (US)

(73) Assignee: R.H. Sheppard Co., Inc., Hanover, PA (US)

( * ) Notice: Subject to any disclaimer, the term of this patent is extended or adjusted under 35 U.S.C. 154(b) by 230 days.

(21) Appl. No.: 16/925,388

(22) Filed: Jul. 10, 2020

(65) Prior Publication Data

US 2021/0010577 A1 Jan. 14, 2021

Related U.S. Application Data

(60) Provisional application No. 62/873,420, filed on Jul. 12, 2019, provisional application No. 62/930,736, filed on Nov. 5, 2019.

(51) Int. Cl.
*F16H 25/22* (2006.01)
*B62D 3/02* (2006.01)

(52) U.S. Cl.
CPC ........... *F16H 25/2214* (2013.01); *B62D 3/02* (2013.01)

(58) Field of Classification Search
CPC .............................. F16H 25/2214; B62D 3/02
See application file for complete search history.

(56) References Cited

U.S. PATENT DOCUMENTS

| | | | |
|---|---|---|---|
| 4,173,987 A | 11/1979 | Kouda | |
| 4,922,761 A * | 5/1990 | Onishi | G01L 5/221 73/862.325 |
| 5,009,110 A * | 4/1991 | Lang | B62D 6/10 73/862.331 |
| 5,020,616 A * | 6/1991 | Yagi | B62D 1/16 439/15 |
| 5,115,685 A * | 5/1992 | Jorgensen | G01L 3/105 73/862.331 |
| 5,267,903 A * | 12/1993 | Kuribayashi | F16D 3/04 464/147 |
| 5,299,649 A | 4/1994 | Sano et al. | |
| 5,730,657 A * | 3/1998 | Olgren | F16D 3/18 464/157 |

(Continued)

*Primary Examiner* — Zakaria Elahmadi
(74) *Attorney, Agent, or Firm* — Warner Norcross + Judd LLP

(57) ABSTRACT

An improved steering shaft assembly is provided. The steering shaft assembly further includes an output shaft that is rotatable with respect to the input shaft. The output shaft includes a rotary valve portion and a longitudinal portion. The steering shaft assembly further includes a torsion bar coupled to the input shaft and coupled to the output shaft distal from the input shaft. The steering shaft assembly further includes a mid-coupler extending around about the longitudinal portion of the output shaft and adapted to cooperate with the rotary valve portion of the output shaft. The steering shaft assembly further includes a screw mechanism extending about the longitudinal portion of the output shaft and adapted to cooperate with the mid-coupler. The screw mechanism is adapted to move laterally relative to the output shaft to maintain transfer of power from between output shaft and the screw mechanism despite misalignments therebetween.

17 Claims, 11 Drawing Sheets

(56) References Cited

U.S. PATENT DOCUMENTS

| | | | |
|---|---|---|---|
| 6,186,015 B1 | 2/2001 | Regueiro et al. | |
| 6,190,264 B1 * | 2/2001 | Al-Rawi | G01L 3/107 |
| | | | 73/862.322 |
| 6,257,075 B1 * | 7/2001 | Bachnak | G01L 5/221 |
| | | | 73/862.322 |
| 6,427,307 B1 * | 8/2002 | Al-Rawi | G01L 3/107 |
| | | | 29/434 |
| 6,520,274 B1 * | 2/2003 | McElmeel, Jr. | B62D 5/0403 |
| | | | 180/443 |
| 6,655,493 B2 * | 12/2003 | Menjak | B62D 6/10 |
| | | | 180/443 |
| 6,863,614 B2 * | 3/2005 | Viola | B62D 6/10 |
| | | | 464/112 |
| 7,013,747 B2 | 3/2006 | Drake | |
| 7,028,545 B2 * | 4/2006 | Gandel | G01L 3/104 |
| | | | 73/328 |
| 7,174,795 B2 * | 2/2007 | Feng | G01D 5/2451 |
| | | | 73/862.331 |
| 8,091,449 B2 | 1/2012 | Fuchigami et al. | |
| 8,528,686 B2 * | 9/2013 | Chandy | G01L 3/104 |
| | | | 335/220 |
| 8,628,267 B2 * | 1/2014 | Li | F16D 1/116 |
| | | | 403/317 |
| 8,746,740 B2 | 6/2014 | Tanaka | |
| 9,346,490 B2 | 5/2016 | Washnock et al. | |
| 9,415,795 B2 | 8/2016 | Hagiwara et al. | |
| 9,731,753 B2 | 8/2017 | Haegele et al. | |
| 2005/0217739 A1 | 10/2005 | Danley et al. | |
| 2006/0151235 A1 | 7/2006 | Chikaraishi | |
| 2008/0078264 A1 | 4/2008 | Yamashita et al. | |
| 2015/0114749 A1 * | 4/2015 | Dutsky | B62D 5/0835 |
| | | | 180/417 |
| 2016/0318547 A1 * | 11/2016 | Dutsky | B62D 5/064 |
| 2020/0398887 A1 * | 12/2020 | Boyle | B62D 3/02 |

* cited by examiner

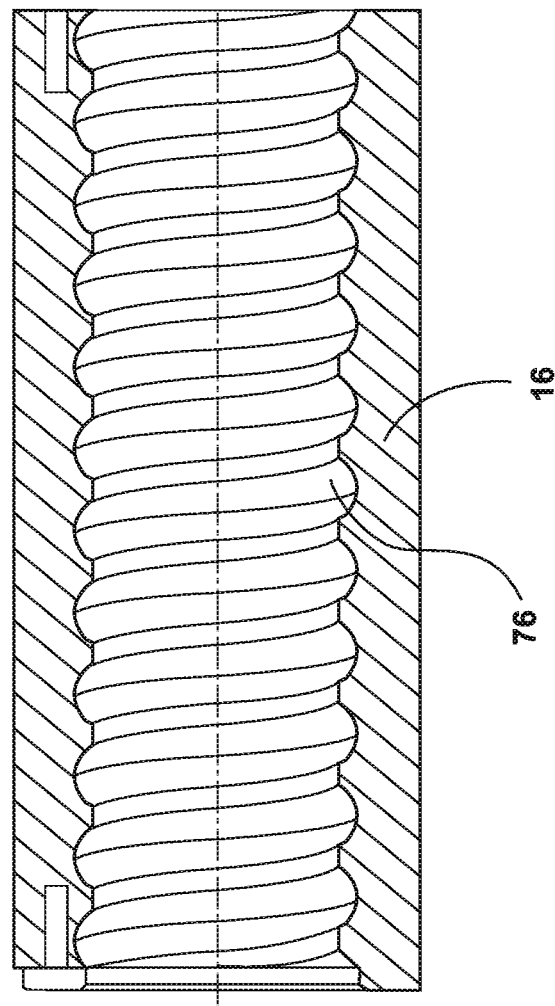
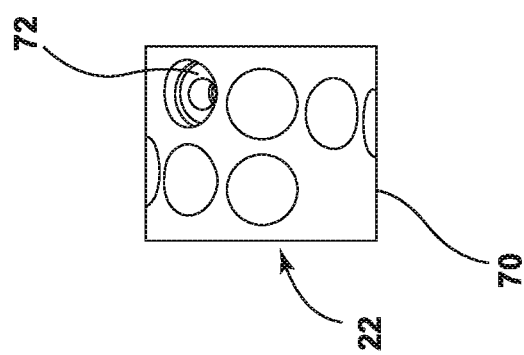
FIG. 4

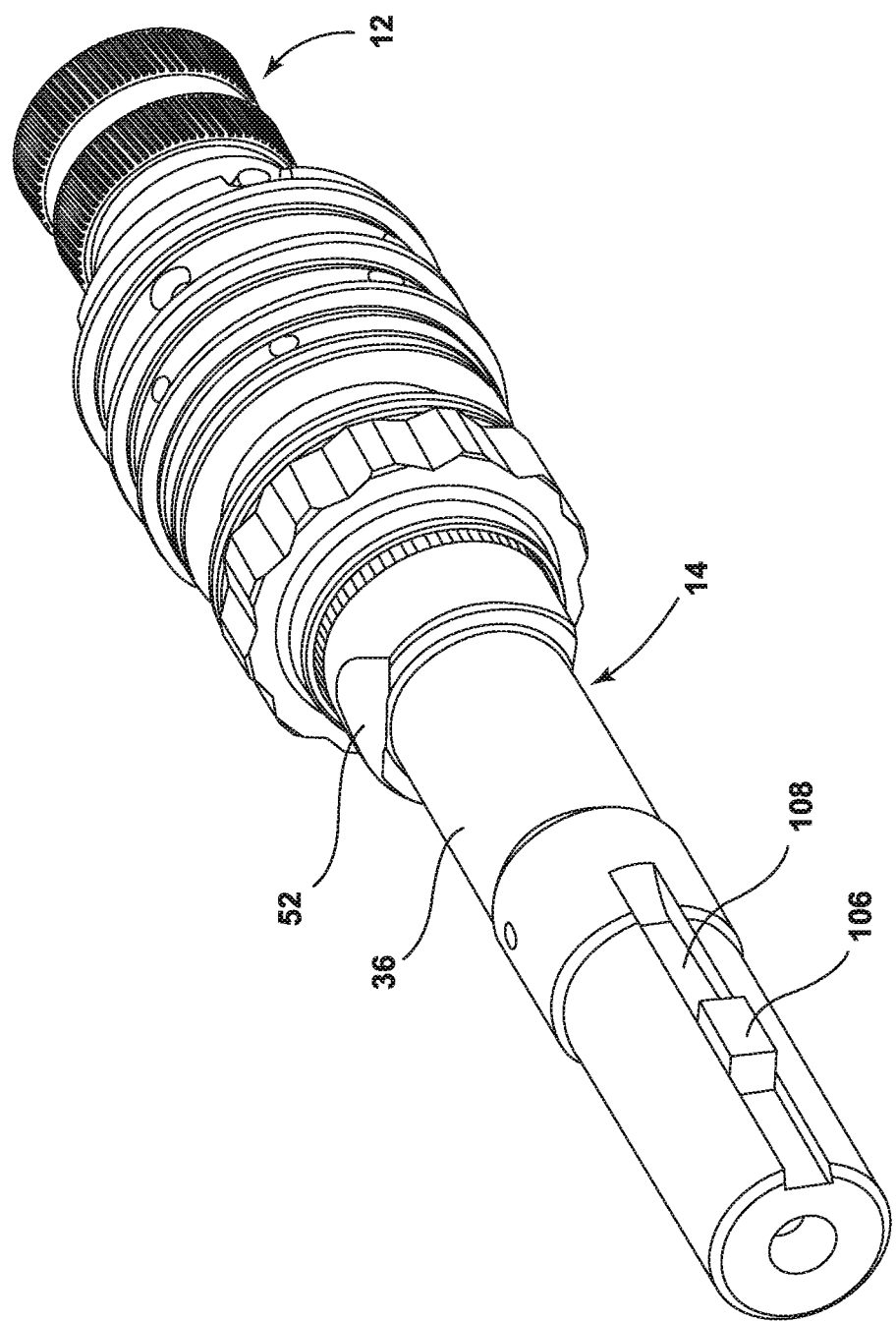

COUPLED STEERING GEAR SHAFT

CROSS-REFERENCE TO RELATED APPLICATIONS

This application claims the benefit of U.S. Provisional Application 62/873,420, filed Jul. 12, 2019, and U.S. Provisional Application 62/930,736, filed Nov. 5, 2019, the disclosures of which are incorporated by reference in their entirety.

FIELD OF THE INVENTION

The present invention relates to a steering shaft assembly adapted to accommodate radial and angular misalignments for power steering and other applications.

BACKGROUND OF THE INVENTION

Many conventional power steering assemblies include an elongated torsion bar joined to an input shaft and to an output shaft. The elongated torsion bar transfers torque applied to the input shaft (in response to rotation of a steering wheel) to the output shaft, causing the output shaft to rotate to a lesser extent than the input shaft. Rotation of the output shaft is typically converted by a recirculating ball screw into linear movement of a piston, which in turn causes rotation of a sector gear and a pitman arm. Movement of the piston is aided by a working fluid on either side of the piston. The working fluid is supplied to a control valve and assists the travel of the piston laterally, which otherwise relies solely on the recirculating ball screw.

Many conventional power steering assemblies combine a rotary valve and a recirculating ball screw shaft into a single unit. Under this construction, however, torque from the input shaft is transmitted to the interior components of the power steering assembly, including for example the seals that separate first and second pressure chambers on either side of the piston. Any misalignments in the power steering assembly will enhance wear on these seals and reduce the operating life and efficiency of the power steering assembly. Further, conventional systems requires special tooling for each platform due to various piston travel lengths. In particular, a longer drill length is necessary to accommodate a longer torsion bar. In addition, the torsion bar and the rotary valve are unique to each platform to accommodate the various piston travel lengths. Moreover, input shafts of conventional systems must interface with the universal joint of the steering column. Any misalignment or mounting error between these components will impose side loads on the input shaft due to its high radial stiffness. This can lead to a malfunction of the input shaft due to excessive fatigue over time.

Accordingly, there remains a continued need for an improved steering shaft assembly that can accommodate radial and angular misalignments, reduce stresses on the input shaft and control valve components, and minimize backlash and high torsional stiffness. In particular, there remains a continued need for an improved power steering shaft assembly that can be used across a variety of vehicles with improved reliability and accessibility over existing systems.

SUMMARY OF THE INVENTION

An improved steering shaft assembly is provided. In one embodiment, the steering shaft assembly includes an input shaft adapted to be connected to a steering wheel, an output shaft that is rotatable with respect to the input shaft, and a torsion bar coupled to the output shaft distal from the input shaft. The steering shaft assembly further includes a mid-coupler extending about an elongated portion of the output shaft. The mid-coupler is adapted to transfer power between the output shaft and a screw mechanism, optionally as a center disk of a modified Oldham coupling.

In this and other embodiments, the output shaft includes first and second inwardly-angled surfaces adapted to cooperate with the mid-coupler. The mid-coupler includes first and second extensions adapted to engage the first and second inwardly-angled surfaces of the output shaft, such that the mid-coupler is rotationally coupled to the output shaft for transferring power to the screw mechanism. The mid-coupler includes an inner diameter that is greater than an outer diameter of the output shaft, such that the mid-coupler can move laterally to maintain the smooth transfer of power between the output shaft and the screw mechanism despite potential radial and angular misalignments therebetween. In other embodiments, the mid-coupler and the screw mechanism include an inner diameter that is substantially equal to the outer diameter of the output shaft, i.e., having a tight tolerance with respect to the outer diameter of the output shaft.

In another embodiment, the screw mechanism includes third and fourth extensions adapted to engage the mid-coupler. The mid-coupler further includes third and fourth inwardly-angled surfaces adapted to cooperate with the third and fourth extensions of the screw mechanism such that the screw mechanism is rotationally coupled to the mid-coupler. The mid-coupler is adapted to move laterally relative to the screw mechanism to maintain the transfer of power between the output shaft and the screw mechanism despite misalignments therebetween.

In still another embodiment, the mid-coupler is a center disk of a modified Oldham coupling, with the first and second hubs of the modified Oldham coupling being the output shaft (or a portion thereof) and the screw mechanism, respectively. The first hub of the modified Oldham coupling may define a first tongue and groove attachment with the center disk. The second hub of the modified Oldham coupling may define a second tongue and groove attachment with the center disk that is perpendicular to the first tongue and groove attachment.

As described below, the improved steering shaft assembly can accommodate radial and angular misalignments, reduce stresses on the input shaft and control valve components, and provide minimum backlash and high torsional stiffness. In particular, the first direction of sliding of the mid-coupler relative to the output shaft and the second direction of sliding of the screw mechanism relative to the mid-coupler are perpendicular to each other. The perpendicular movement of the mid-coupler relative to the screw mechanism provides for two-axis adjustments, transverse to an axis of rotation of the control valve, to account for misalignments.

These and other features and advantages of the present invention will become apparent from the following description of the invention, when viewed in accordance with the accompanying drawings and the appended claims.

BRIEF DESCRIPTION OF THE DRAWINGS

FIG. 4 is a first cross-sectional view of a ball screw and ball nut for the steering shaft assembly of FIG. 1.

FIG. 11 is a perspective view of a steering shaft assembly including a removable key to aid in the installation of the ball screw of FIGS. 9 and 10.

DETAILED DESCRIPTION OF THE CURRENT EMBODIMENTS

Figure 1:
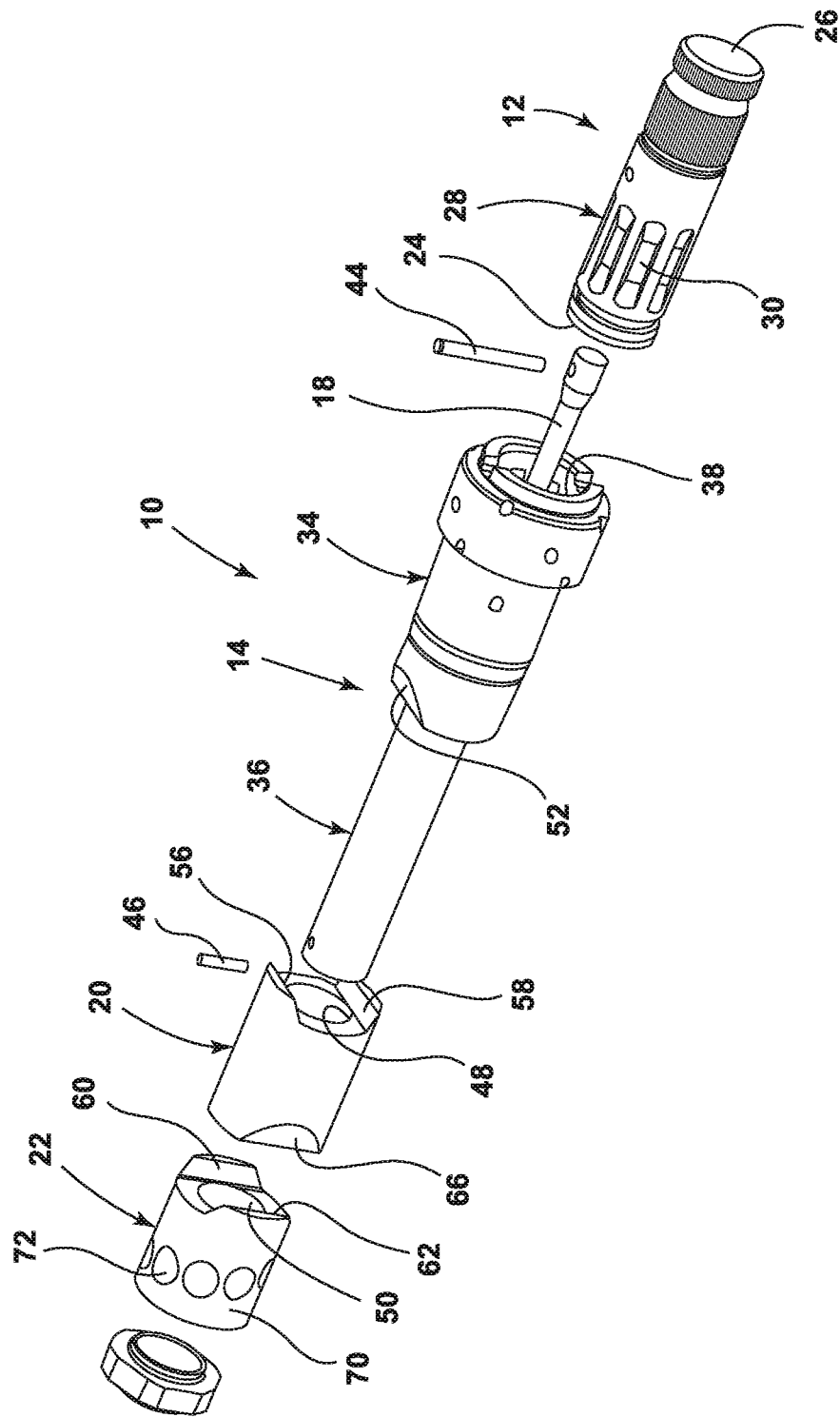
FIG. 1 is an exploded view of a steering shaft assembly in accordance with one embodiment of the present invention.
Figure 2:
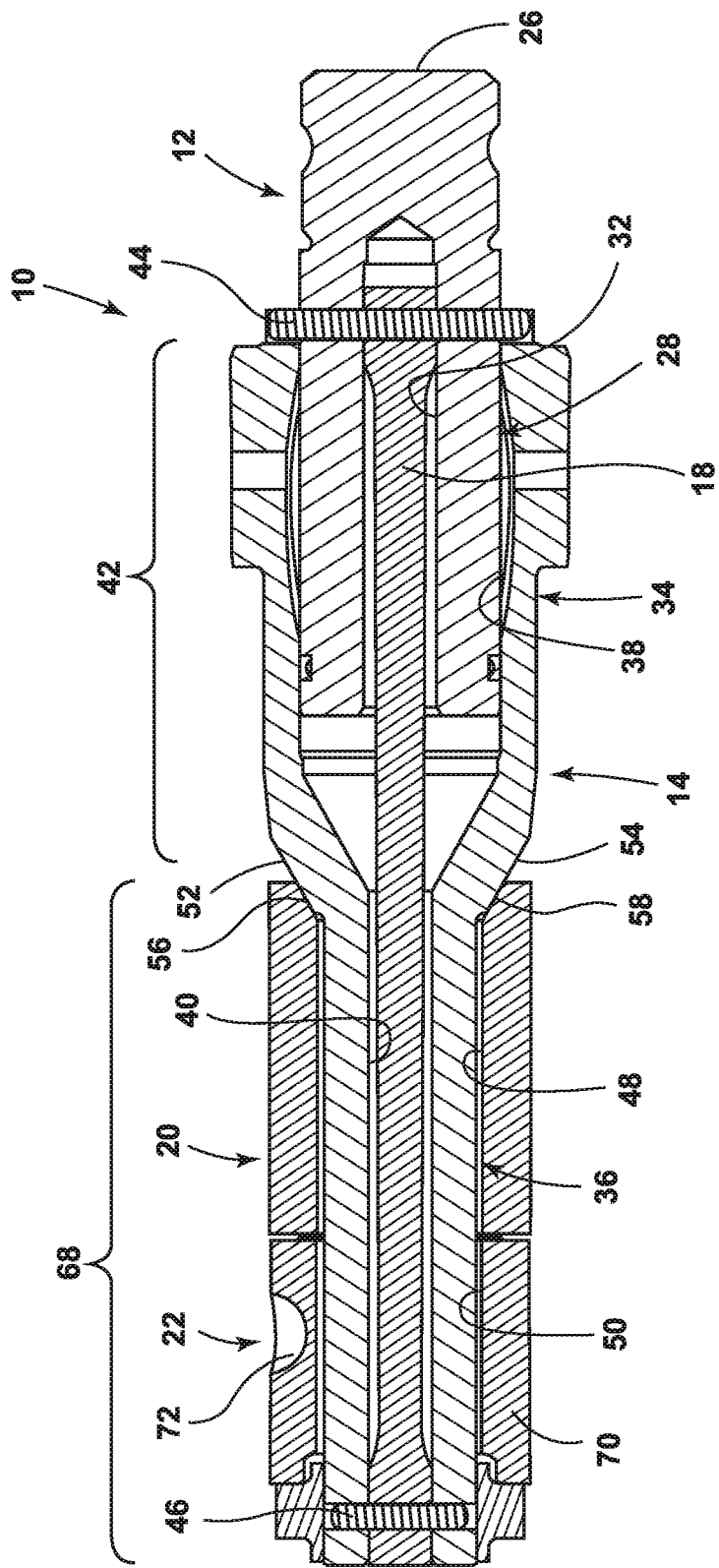
FIG. 2 is a cross-sectional view of the steering shaft assembly of FIG. 1.
Figure 3:
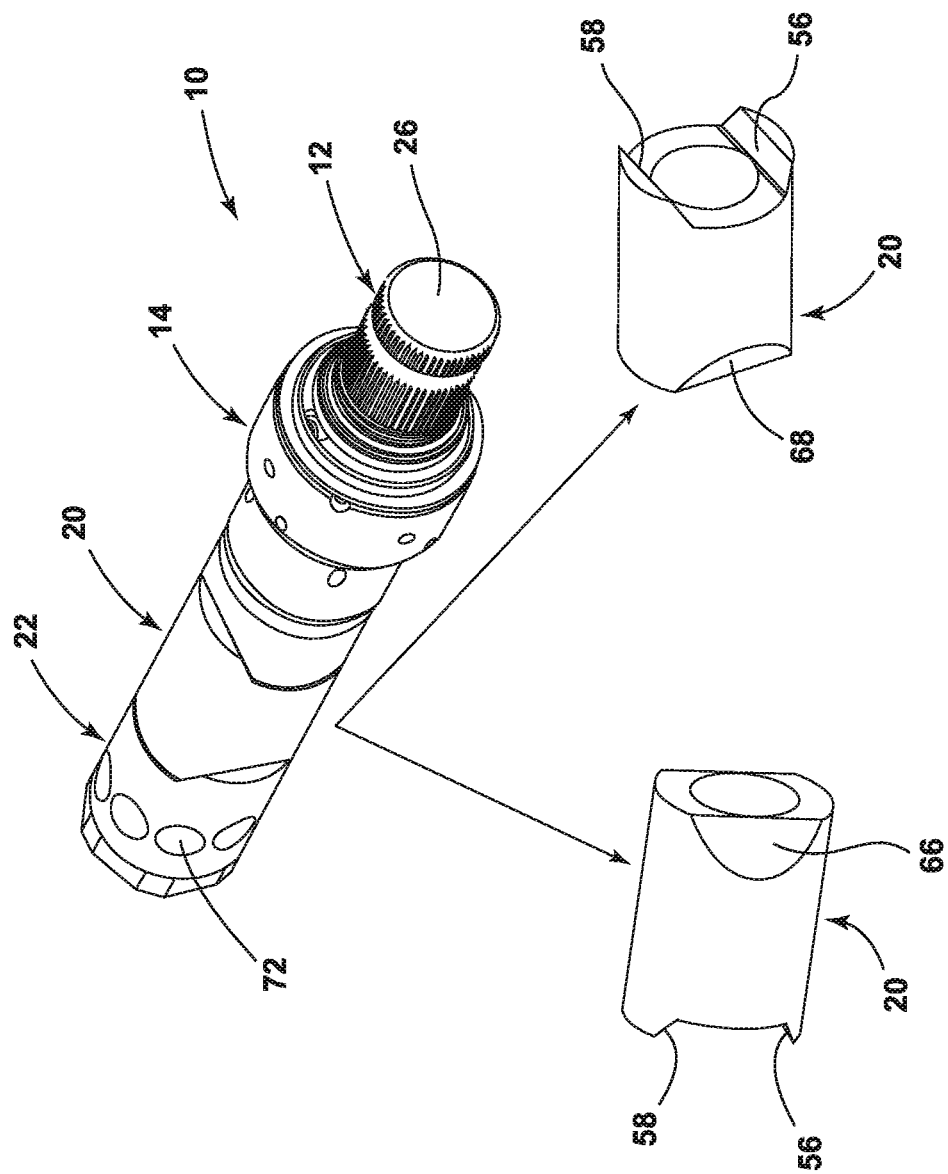
FIG. 3 is a perspective view of the steering shaft assembly of FIG. 1 illustrating a modified Oldham coupling.

Referring to FIGS. 1-3, a steering shaft assembly in accordance with one embodiment is illustrated and generally designated 10. The steering shaft assembly 10 generally includes an input shaft 12, an output shaft 14, a piston 16 (shown in FIG. 5), a torsion bar 18, a mid-coupler 20, and a ball screw mechanism 22 (referred to as a "screw mechanism" herein). The input shaft 12 is coupled to the output shaft 14 by the torsion bar 18 for transferring power between the input shaft 12 and the output shaft 14. The mid-coupler 20 is adapted to cooperate with the output shaft 14 for transferring power between the output shaft 14 and the mid-coupler 20. The screw mechanism 22 is adapted to cooperate with the mid-coupler 20 for transferring power between the mid-coupler 20 and the screw mechanism 22. The screw mechanism 22 is adapted to cause the piston 16 to move laterally relative to the output shaft 14 to convert rotation of the output shaft 14 through the mid-coupler 20 into rotation of the screw mechanism 22 despite misalignments therebetween. Each such feature of the steering shaft assembly 10 is described below.

As noted above, the input shaft 12 is adapted to be connected to a steering wheel or other control device, for example a motor or miter box. The input shaft 12 includes an inner end 24 and an outer end 26 spaced from the inner end 24. The input shaft 12 further includes a valve core 28 disposed between inner end 24 and the outer end 26. The valve core 28 defines a plurality of directional-control grooves 30 that are circumferentially spaced from each other and will be described in greater detail below. The input shaft 12 defines a bore 32 extending from the inner end 24 to within the input shaft 12 for receiving the torsion bar 18. In certain embodiments, the input shaft 12 and the valve core 28 are formed as a one-piece integral member.

The output shaft 14 is rotatable with respect to the input shaft 12. The output shaft 14 includes a rotary valve portion 34 and a longitudinal portion 36. The rotary valve portion 34 defines a valve cavity 38 having a first circumference and a torsion bar cavity 40 having a second circumference with the valve cavity 38 extending from the rotary valve portion 34 to the torsion bar cavity 40 and the torsion bar cavity 40 extending through the longitudinal portion 36. In certain embodiments, the first circumference is greater than the second circumference. The valve cavity 38 is configured to receive the inner end 24 of the input shaft 12 and the valve core 28 of the input shaft 12. The torsion bar cavity 40 is configured to receive the torsion bar 18. In certain embodiments, the rotary valve portion 34 and the longitudinal portion 36 are formed as a one-piece integral member.

The valve core 28 is coaxially mounted in the valve cavity 38 for rotation about an axis of rotation. The rotary valve portion 34 and the valve core 28 of the input shaft 12 cooperate to define a control valve 42 for power steering. The control valve 42 is configured to selectively supply a working fluid (e.g., hydraulic oil) fed from an external pressure source, into one of first and second pressure chambers on either side of the piston 16. The plurality of directional-control grooves 30 cooperate with the rotary valve portion 34 to selectively supply the working fluid based on relative alignment of the valve core 28 and the rotary valve portion 34. The valve core 28 has limited rotation with respect to the rotary valve portion 34 to operate the control valve 42 due to the torsion bar 18.

The torsion bar 18 is coupled to the input shaft 12 and extends concentrically within the output shaft 14. In various embodiments, the torsion bar 18 extends between the bore 32 of the input shaft 12 and the torsion bar cavity 40 of the output shaft 14. The torsion bar 18 is also coupled to the output shaft 14 distal from the input shaft 12. The torsion bar 18 may be coupled to the input shaft 12 by a first pin 44 and may be coupled to the output shaft 14 by a second pin 46. In other words, the input shaft 12, torsion bar 18, and output shaft 14 may be integrally connected to each other by the first pin 44 and the second pin 46. The torsion bar 18 biases the valve core 28 and the rotary valve portion 34, relative to each other, to a centered condition of the control valve 42. Rotation of the valve core 28, thereby changing the control valve 42 from the centered condition to an off-center condition, twists the torsion bar 18 and generates a biasing force that urges the control valve 42 (i.e., the valve core 28 and the rotary valve portion 34, relative to each other) back to the centered condition.

The mid-coupler 20 extends about the longitudinal portion 36 of the output shaft 14. The mid-coupler 20 may define an orifice 48 extending therethrough. In the embodiment shown in FIG. 2, the inner diameter of the mid-coupler 20 is substantially equal to the outer diameter of the longitudinal portion 36 of the output shaft 14. In other embodiments, the mid-coupler 20 include an inner diameter that is greater than an outer diameter of the output shaft, such that the mid-coupler 20 can move laterally to account for any misalignments between the longitudinal portion 36 of the output shaft 14 and the screw mechanism 22. The mid-coupler 20 may be configured to receive the longitudinal portion 36 and abut the rotary valve portion 34 of the output shaft 14. The mid-coupler 20 is adapted to cooperate with the rotary valve portion 34 of the output shaft 14 for transferring power between the rotary valve portion 34 and the mid-coupler 20. In various embodiments, the mid-coupler 20 is rotationally coupled to the rotary valve portion 34 such that rotation of the rotary valve portion 34 results in rotation of the mid-coupler 20. Optionally, the mid-coupler 20 may be adapted to move laterally relative to the output shaft 14 to maintain the transfer of power between the output shaft 14 and the mid-coupler 20 despite misalignments therebetween. "Laterally" as defined herein with regard to movement of the mid-coupler 20 relative to the output shaft 14 means that at least a portion of the mid-coupler 20 moves, shifts, slides, pivots, or bends, relative to the output shaft 14, transverse to the axis of rotation.

Like the mid-coupler 20, the screw mechanism 22 also extends about the longitudinal portion 36 of the output shaft 14. The screw mechanism 22 may define a cavity 50 extending therethrough. The screw mechanism 22 may be configured to receive the longitudinal portion 36 and abut the mid-coupler 20. The screw mechanism 22 is adapted to cooperate with the mid-coupler 20 for transferring power between the mid-coupler 20 and the screw mechanism 22. The screw mechanism 22 is rotationally coupled to the mid-coupler 20 such that rotation of the mid-coupler 20 results in rotation of the screw mechanism 22. Optionally, the screw mechanism 22 is adapted to move laterally relative to the output shaft 14 to maintain the transfer of power between the output shaft 14 and the screw mechanism 22 despite misalignments therebetween. "Laterally" as defined herein with regard to movement of the screw mechanism 22 relative to the output shaft 14 means that at least a portion of the screw mechanism 22 moves, shifts, slides, pivots, or bends, relative to the output shaft 14, out of alignment with the axis of rotation. In addition, the screw mechanism 22 may be free to move laterally relative to the mid-coupler 20. "Laterally" as defined herein with regard to movement of the screw mechanism 22 relative to the mid-coupler 20 means that at least a portion of the screw mechanism 22 moves, shifts, slides, pivots, or bends, relative to the mid-coupler 20, transverse to the axis of rotation.

Referring specifically to FIG. 3, in certain embodiments, the rotary valve portion 34 of the output shaft 14 includes first and second inwardly-angled surfaces 52, 54 adapted to cooperate with the mid-coupler 20. The mid-coupler 20 includes first and second extensions 56, 58 adapted to engage the first and second inwardly-angled surfaces 52, 54 of the rotary valve portion 34 such that the mid-coupler 20 is rotationally coupled to the rotary valve portion 34 for transferring power between the rotary valve portion 34 and the mid-coupler 20. In these embodiments, the mid-coupler 20 is adapted to move laterally relative to the rotary valve portion 34 to maintain the transfer of power between the output shaft 14 and the mid-coupler 20 despite misalignments therebetween by permitting sliding, in a first direction, of the mid-coupler 20 adjacent the first and second extensions 56, 58 along the first and second inwardly-angled surfaces 52, 54 of the rotary valve portion 34.

As shown in FIG. 2, the screw mechanism 22 includes third and fourth extensions 60, 62 adapted to engage the mid-coupler 20. The mid-coupler 20 further includes third and fourth inwardly-angled surfaces 66, opposite the first and second extensions, adapted to cooperate with the third and fourth extensions 60, 62 of the screw mechanism 22 such that the screw mechanism 22 is rotationally coupled to the mid-coupler 20 for transferring power between the mid-coupler 20 and the screw mechanism 22. The screw mechanism 22 can optionally move laterally relative to the mid-coupler 20 to maintain the transfer of power between the output shaft 14 and the screw mechanism 22, despite misalignments therebetween, by permitting sliding in a second direction of the screw mechanism 22 adjacent the third and fourth extensions 60, 62 along the third and fourth inwardly-angled surfaces 66 of the mid-coupler 20. The first direction of sliding of the mid-coupler 20 relative to the rotary valve portion 34 and the second direction of sliding of the screw mechanism 22 relative to the mid-coupler 20 are generally perpendicular to each other. The perpendicular movement of the mid-coupler 20 relative to the screw mechanism 22 provides two-axis adjustments, transverse to the axis of rotation, to account for misalignments of the screw mechanism 22 and the output shaft 14.

In this embodiment, the mid-coupler 20 and the output shaft 14 include an angled interface. In other embodiments, the interface is not angled. For example, the proximal end of the mid-coupler 20 can include first and second extensions 56, 58 each having a flat engagement surface extending parallel to the axis of rotation, and generally facing each other. Similarly, the output shaft 14 can include outward-facing flat surfaces 52, 54 adapted to engage the inward-facing flat surfaces of the mid-coupler 20. Similar to the embodiment of FIG. 3, rotation of the output shaft 14 is converted into rotation of the mid-coupler 20. In like manner, the distal end of the mid-coupler 20 can include third and fourth flat surfaces 66, 68 that extend parallel to the axis of rotation. The screw mechanism 22 includes third and fourth extensions 60, 62 each having a flat engagement surface extending parallel to the axis of rotation, and generally facing each other, such that rotation of the mid-coupler 20 is converted into rotation of the screw mechanism 22.

In various embodiments, a modified Oldham coupling 68 includes a first hub, a second hub, and a center disk with the center disk disposed between the first hub and the second hub. In these embodiments, the mid-coupler 20 defines the center disk, the rotary valve portion 34 defines the first hub, and the screw mechanism 22 defines the second hub. The first hub of the modified Oldham coupling 68 may define a first tongue and groove attachment with the center disk. The second hub of the modified Oldham coupling 68 may define a second tongue and groove attachment with the center disk. The first tongue and groove attachment is perpendicular to the second tongue and groove attachment thereby providing two-axis adjustments, transverse to the axis of rotation, to account for misalignments of the screw mechanism 22 and the output shaft 14.

In other embodiments, the rotary valve portion 34, the mid-coupler 20, and the screw mechanism 22 are configured to cooperate to form other forms of coupling including, but not limited to, beam coupling, elastic coupling, Schmidt offset couplings, etc., so long as the screw mechanism 22 is adapted to move laterally relative to the output shaft 14 to maintain the transfer of power between the output shaft 14 and the screw mechanism 22 despite misalignments therebetween.

Figure 5:
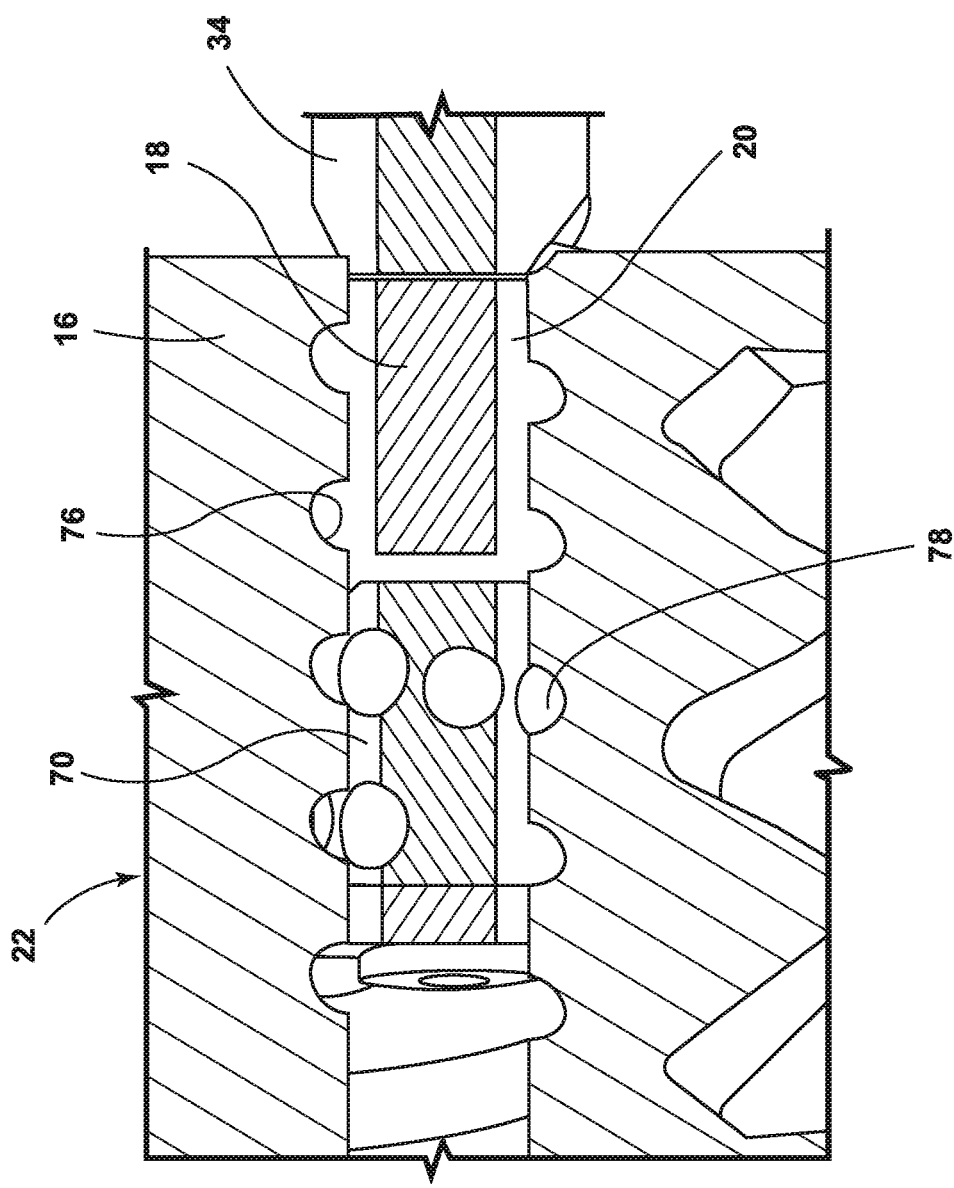
FIG. 5 is a second cross-sectional view of a ball screw and ball nut for the steering shaft assembly of FIG. 1.
Figure 6:
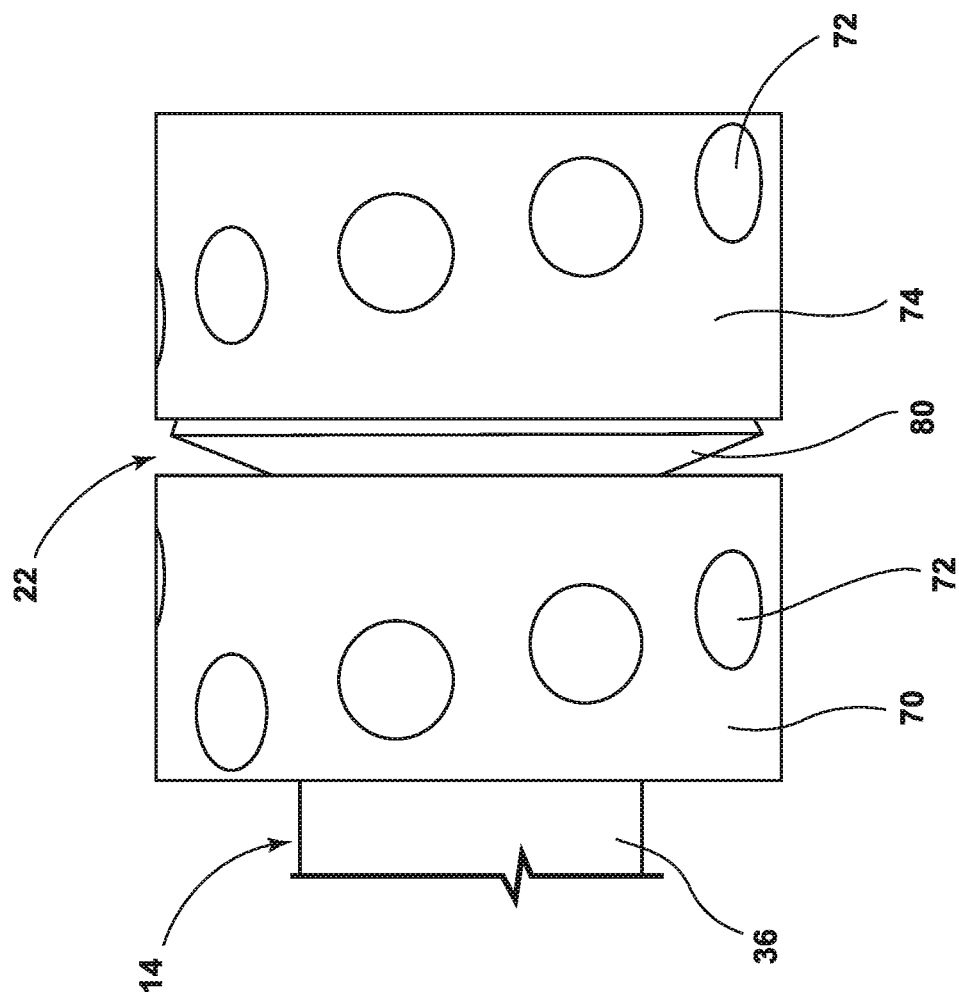
FIG. 6 is a side view of a ball screw in accordance with another embodiment.

The screw mechanism 22 includes a piston 16 disposed about the screw mechanism 22. The screw mechanism 22 converts rotary motion of the input shaft 12 into linear motion of the piston 16. The screw mechanism 22 is a ball screw in the illustrated embodiment, but may be any screw mechanism for linear actuation, including for example a leadscrew (e.g., ACME thread) or a planetary roller screw. Referring to FIGS. 4 and 5, in certain embodiments, the ball screw mechanism 22 includes a ball socket 70 disposed about the output shaft 14. The ball socket 70 is rotationally coupled to the mid-coupler 20 such that rotation of the mid-coupler 20 results in rotation of the ball socket 70. The ball socket 70 includes a plurality of recesses 72 disposed in a helical path about an outer circumference thereof. In certain embodiments, the ball socket 70 includes the plurality of recesses 72 only within a single turn of the helical path. In various embodiments, each of the plurality of recesses 72 is generally semi-hemispherical. Referring to FIG. 6, in other embodiments, the ball screw mechanism 22 further include an additional ball socket 74. The ball screw mechanism 22 may further include a compression spring 80 disposed between the ball socket 70 and the additional ball socket 74. The additional ball socket 74 may include a plurality of recesses 72 disposed in a helical path about an outer circumference thereof.

Referring again to FIGS. 4 and 5, the ball screw mechanism 22 further includes a piston 16 disposed about the ball socket 70. The piston 16 has an inner circumference defining a female thread groove 76 (optionally having a gothic arch cross-section) in correspondence with the plurality of recesses 72. The ball screw mechanism 22 further includes a plurality of balls 78 captured within the plurality of recesses 72 for converting rotary movement of the ball socket 70 into linear movement of the piston 16. In embodiments wherein the screw mechanism 22 includes the additional ball socket 74, the piston 16 is also disposed about the additional ball socket 74. Further, in embodiments wherein the screw mechanism 22 includes the additional ball socket 74, the plurality of recesses 72 of the additional ball socket 74 includes a plurality of balls 78 captured within the plurality of recesses 72 for converting rotary movement of the additional ball socket 74 into linear movement of the piston 16.

Turning the steering wheel rotates the valve core 28 and changes the control valve 42 from the centered condition to the off-center condition. The working fluid is fed from the external pressure source into one of the first and the second pressure chambers (not shown) on one side of the piston 16. The piston 16 then moves linearly and forces fluid out of the other of the first and the second pressure chambers. Fluid returning from the other pressure chamber flows back to the control valve 42. For example, when the steering wheel is turned so that the piston moves toward the first pressure chamber, working fluid is supplied to the second pressure chamber by way of the control valve 42. The working fluid is therefore discharged from the external pressure source and supplied to the second pressure chamber. As a result, the pressure in the second pressure chamber rises, thereby providing a steering-assistance force to the piston 16 so that most of the steering effort to move the piston 16 toward the first pressure chamber is provided by the hydraulic pressure increase in the second pressure chamber. Conversely, when the steering wheel is turned so that the piston 16 moves toward the second chamber, the working fluid is supplied to the first pressure chamber by way of the control valve 42. As a result, the pressure in the first pressure chamber rises, thereby providing a steering-assistance force to the piston 16 so that most of the steering effort to move the piston 16 toward the second pressure chamber is provided by the hydraulic pressure in the first pressure chamber.

The control valve 42 (i.e., the valve core 28 and the rotary valve portion 34, relative to each other) returns to the centered condition when the steerable wheels have turned to the extent corresponding to the turning of the steering wheel. By including the screw mechanism 22 that is adapted to move laterally relative to the output shaft 14 to maintain the transfer of power between the output shaft 14 and the screw mechanism 22 despite misalignments therebetween, reliability of steering shaft assembly 10 is improved by reducing stresses on the input shaft and control valve components, and performance of the motor vehicle is improved by providing minimum backlash and high torsional stiffness. It is also to be appreciated that lengths of the mid-coupler 20 and the screw mechanism 22, or the helical layout of the plurality of recesses 72, can be adjusted for use in various steering assemblies having different lengths and configurations thereby reducing the need for special tooling unique for each steering shaft assembly length or configuration.

Figure 7:
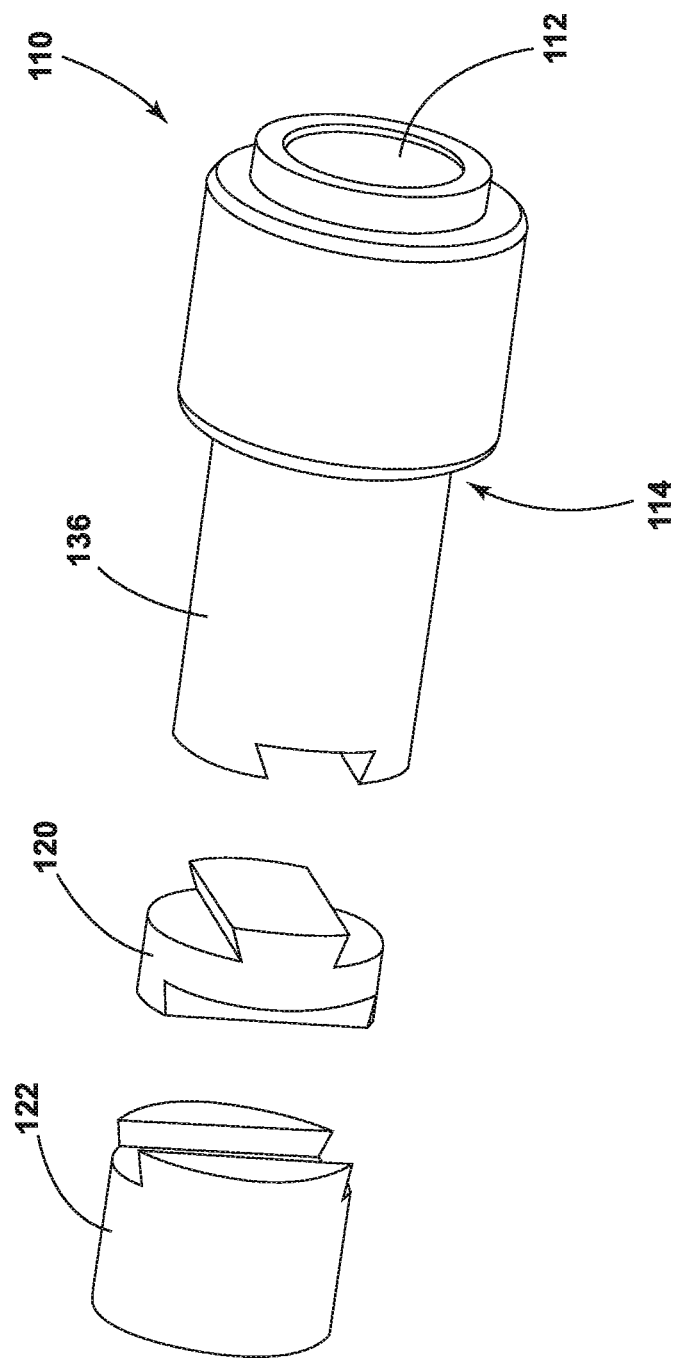
FIG. 7 is a perspective view of a further modified Oldham coupling for another embodiment of the present invention.
Figure 8:
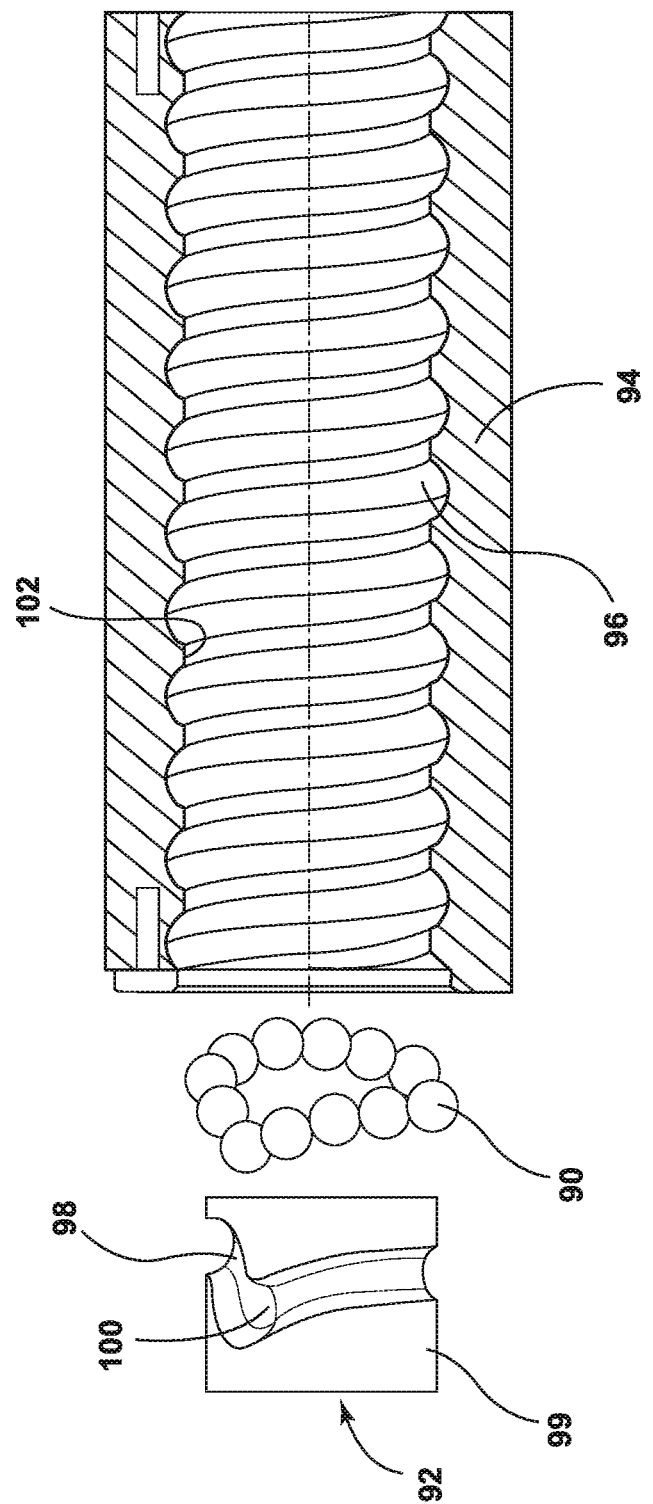
FIG. 8 is a cross-sectional view of a ball screw and ball nut for the steering shaft assembly of FIG. 1 in accordance with a further embodiment.
Figure 10:
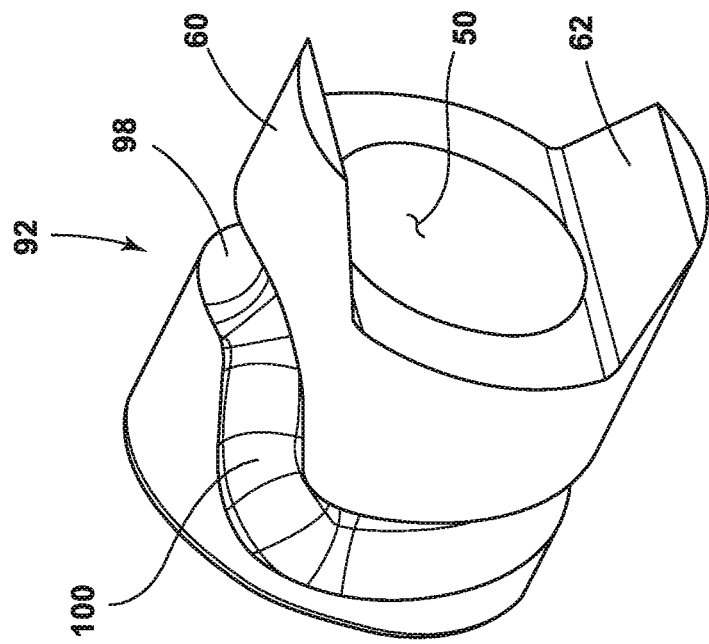
FIG. 10 is a second perspective view of the ball screw of FIG. 9 further illustrating the helical raceway for continuous recirculation of a plurality of bearings.

An alternative steering shaft assembly is depicted in FIG. 7 and is generally designated 110, in which the mid-coupler and the screw mechanism are not mounted about the output shaft. In particular, the output shaft 114 includes an opening 112 for an input shaft and includes a longitudinal portion 136. The mid-coupler 120 is adapted to cooperate with the longitudinal portion 136 of the output shaft 114 for transferring power between the longitudinal portion 136 and the screw mechanism 122 as a modified Oldham coupling. The modified Oldham coupling includes a first hub, a second hub, and a center disk with the center disk disposed between the first hub and the second hub. The mid-coupler 120 defines the center disk, the longitudinal portion 136 defines the first hub, and the screw mechanism 122 defines the second hub such that the mid-coupler 120 is adapted to transfer power between the output shaft 114 and the screw mechanism 122 despite misalignments therebetween. The first hub of the modified Oldham coupling defines a first tongue and groove attachment with the center disk. The second hub of the modified Oldham coupling 68 defines a second tongue and groove attachment with the center disk. The first tongue and groove attachment is perpendicular to the second tongue and groove attachment thereby providing two-axis adjustments, transverse to the axis of rotation, to account for misalignments of the screw mechanism 122 and the output shaft 114. The steering shaft assembly 110 of FIG. 7 is otherwise structurally and functionally similar to the steering shaft assembly 10 described above.

As optionally shown in FIGS. 8-12, the screw mechanism 22 can internally recirculate the bearing balls 90, i.e., without the need for an external recirculation path. In this embodiment, the screw mechanism 22 includes a ball screw 92 and a steering piston 94, with the bearing balls 90 being retained in a raceway between a helical groove 96 of the steering piston 94 and a helical groove 98 of the ball screw 92. In the embodiment shown in FIGS. 8-12, the helical groove 98 of the ball screw 92 includes a recirculation passage 100 of greater depth (relative to the remainder of the helical groove 98) to allow the plurality of bearing balls 90 to recirculate over the land 102 between adjacent turns of the helical piston groove 96. The ball screw 92 is disposed about the output shaft 14 (shown in FIG. 12), and the helical groove 98 is defined within an outer circumference 99 of the ball screw 92. During rotation of the ball screw 92 in the clockwise (counter-clockwise) direction, which is caused by rotation of the mid-coupler 20, the bearing balls 90 move within the raceway defined between the ball screw 92 and the steering piston 94. This movement of the bearing balls 90 causes the steering piston 94 to translate laterally in a right (left) direction. The bearing balls 90 enter the recirculation passage 100 and travel in the left (right) direction, over the land 102, before continuing along the raceway. Because the bearing balls 90 are recirculated internally, without an external recirculation passage, the steering assembly can be made more compact, among other benefits.

Figure 9:
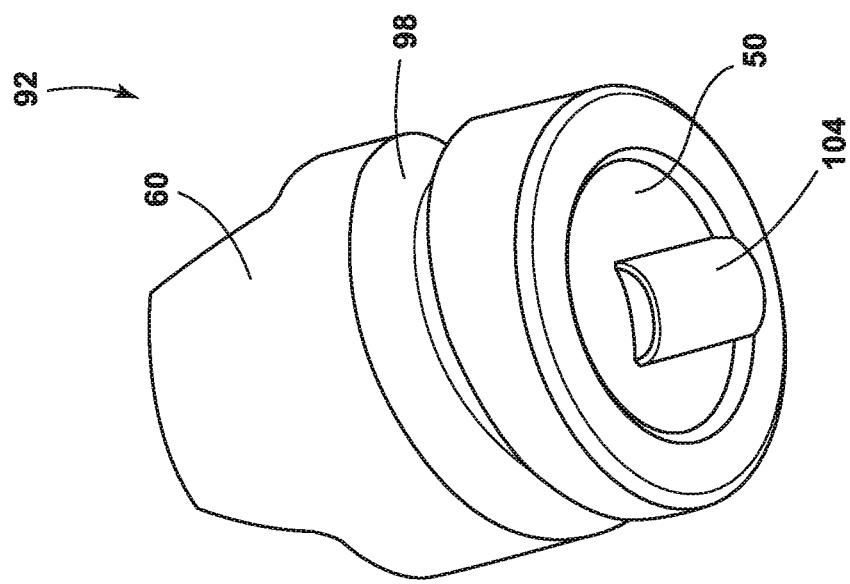
FIG. 9 is a first perspective view of a ball screw including a helical raceway for continuous recirculation of a plurality of bearings.
Figure 12:
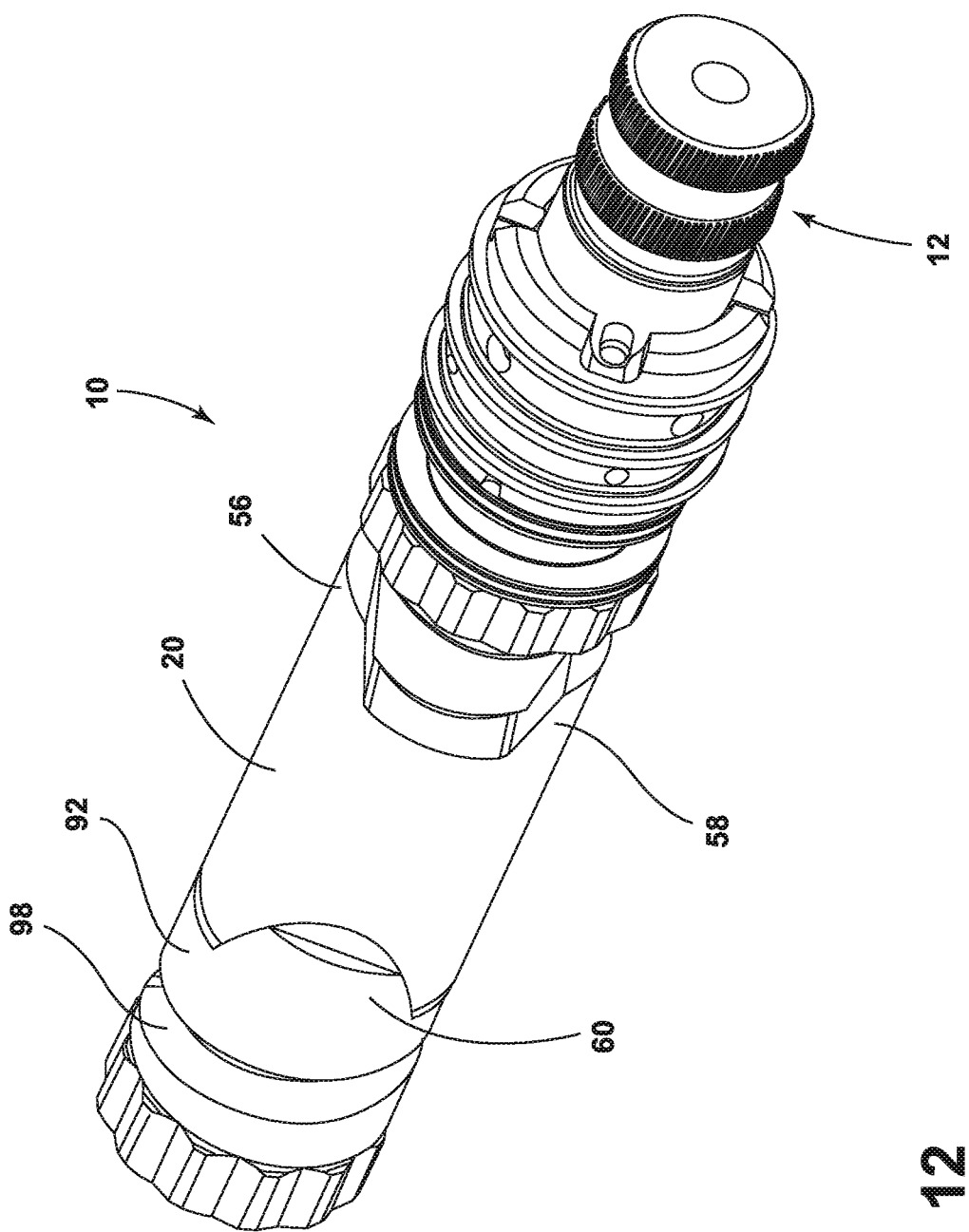
FIG. 12 is a perspective view of the steering shaft assembly of FIG. 11 including the ball screw of FIGS. 9 and 10.

As also shown in FIG. 9, the ball screw 92 includes key slot 104 for a key 106. The key slot 104 extends in the axial direction of the internal cavity 50 through only a portion of the ball screw 92. In addition, the output shaft 14 includes an axial groove 108 for the key 106. The key 106 aids in the manual assembly of the ball screw 92 onto the output shaft 14 by limiting rotation of the ball screw 92 relative to the output shaft 14, optionally during installation of the plurality of bearing 90. The ball screw 92 is free to rotate with the output shaft 14 in response to rotation of the mid-coupler 20.

The above description is that of current embodiments. Various alterations and changes can be made without departing from broader aspects of the invention as defined in the appended claims, which are to be interpreted in accordance with the principles of patent law including the doctrine of equivalents. This disclosure is presented for illustrative purposes and should not be interpreted as an exhaustive description of all embodiments or to limit the scope of the claims to the specific elements described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A steering shaft assembly comprising:
   an input shaft adapted to be connected to a control device;
   an output shaft that is rotatable with respect to the input shaft, the output shaft including a rotary valve portion and a longitudinal portion;
   a torsion bar coupled to the input shaft and extending concentrically within the output shaft, the torsion bar coupled to the output shaft distal from the input shaft;
   a screw mechanism extending about the longitudinal portion of the output shaft for converting rotation of the output shaft into linear movement of a steering piston; and
   a mid-coupler extending about the longitudinal portion of the output shaft to convert rotational movement of the output shaft into rotational movement of the screw mechanism;
   wherein a rotational coupling comprises a first hub, a second hub, and a center disk with the center disk disposed between the first hub and the second hub, and wherein the mid-coupler defines the center disk, the rotary valve portion defines the first hub, and the screw mechanism defines the second hub.

2. The steering shaft assembly of claim 1 wherein the mid-coupler defines an inner diameter that is greater than an outer diameter defined by the longitudinal portion of the output shaft.

3. The steering shaft assembly of claim 1 wherein the rotary valve portion of the output shaft and the input shaft cooperate to define a control valve for power steering.

4. The steering shaft assembly of claim 1 wherein the rotary valve portion of the output shaft comprises first and second inwardly-angled surfaces adapted to cooperate with the mid-coupler.

5. The steering shaft assembly of claim 4 wherein the mid-coupler comprises first and second extensions adapted to engage the first and second inwardly-angled surfaces of the rotary valve portion.

6. The steering shaft assembly of claim 5 wherein the mid-coupler further comprises third and fourth inwardly-angled surfaces, opposite the first and second extensions, adapted to cooperate with the screw mechanism.

7. The steering shaft assembly of claim 6 wherein the screw mechanism comprises third and fourth extensions adapted to engage the third and fourth inwardly-angled surfaces of the mid-coupler.

8. The steering shaft assembly of claim 1 wherein the first hub of the rotational coupling defines a first tongue and groove attachment with the center disk and wherein the second hub of the rotational coupling defines a second tongue and groove attachment with the center disk.

9. The steering shaft assembly of claim 8 wherein the first tongue and groove attachment is perpendicular to the second tongue and groove attachment.

10. The steering shaft assembly of claim 1 wherein the screw mechanism comprises:
    a ball screw including a helical groove about an outer circumference thereof, wherein the helical groove includes a recirculation passage;
    a steering piston disposed about the ball screw and having an inner circumference defining a helical groove and a land between adjacent turns thereof; and
    a plurality of balls retained between the helical groove of the ball screw and the helical groove of the steering piston, wherein the recirculation passage includes an increased depth to allow the plurality of balls to internally recirculate over the land between adjacent turns of the helical groove of the steering piston.

11. The steering shaft assembly of claim 1 wherein the screw mechanism comprises:
    a ball socket disposed about the output shaft and including a plurality of recesses disposed in a helical path about an outer circumference thereof;
    a steering piston disposed about the ball socket and having an inner circumference defining a female thread groove in correspondence with the plurality of recesses; and
    a plurality of balls captured within the plurality of recesses for converting rotary movement of the ball socket into linear movement of the steering piston.

12. The steering shaft assembly of claim 11 wherein each of the plurality of recesses is generally semi-hemispherical.

13. The steering shaft assembly of claim 11 wherein the ball screw mechanism further comprises an additional ball socket and a compression spring disposed between the ball socket and the additional ball socket, the additional ball socket comprising a plurality of recesses disposed in a helical path about an outer circumference thereof.

14. The steering shaft assembly of claim 1 wherein the output shaft includes a key extending radially outward therefrom, and wherein the screw mechanism includes a ball screw mounted about the output shaft, the ball screw defining a key slot for receiving the key, such that the ball screw rotates in unison with the output shaft when the key is received within the key slot.

15. A steering shaft assembly comprising:
    an input shaft adapted to be connected to a control device;
    an output shaft that is rotatable with respect to the input shaft, the output shaft comprising a rotary valve portion and a longitudinal portion;
    a torsion bar coupled to the input shaft and extending concentrically within the output shaft, the torsion bar coupled to the output shaft distal from the input shaft;
    a mid-coupler adapted to cooperate with the longitudinal portion of the output shaft for transferring power between the longitudinal portion and the mid-coupler; and
    a screw mechanism adapted to cooperate with the mid-coupler for transferring power between the mid-coupler and the screw mechanism,
    wherein a rotational coupling comprises a first hub, a second hub, and a center disk with the center disk disposed between the first hub and the second hub, and wherein the mid-coupler defines the center disk, the longitudinal portion defines the first hub, and the screw mechanism defines the second hub such that the mid-coupler is adapted to transfer power between the output shaft and the screw mechanism despite misalignments therebetween.

16. The steering shaft assembly of claim 15 wherein the first hub of the rotational coupling defines a first tongue and groove attachment with the center disk and wherein the second hub of the rotational coupling defines a second tongue and groove attachment with the center disk.

17. The steering shaft assembly of claim 15 wherein the output shaft includes a key extending radially outward therefrom, and wherein the screw mechanism includes a ball screw mounted about the output shaft, the ball screw defining a key slot for receiving the key, such that the ball screw rotates in unison with the output shaft when the key is received within the key slot.

\* \* \* \* \*